United States Patent Office 3,288,238
Patented Nov. 29, 1966

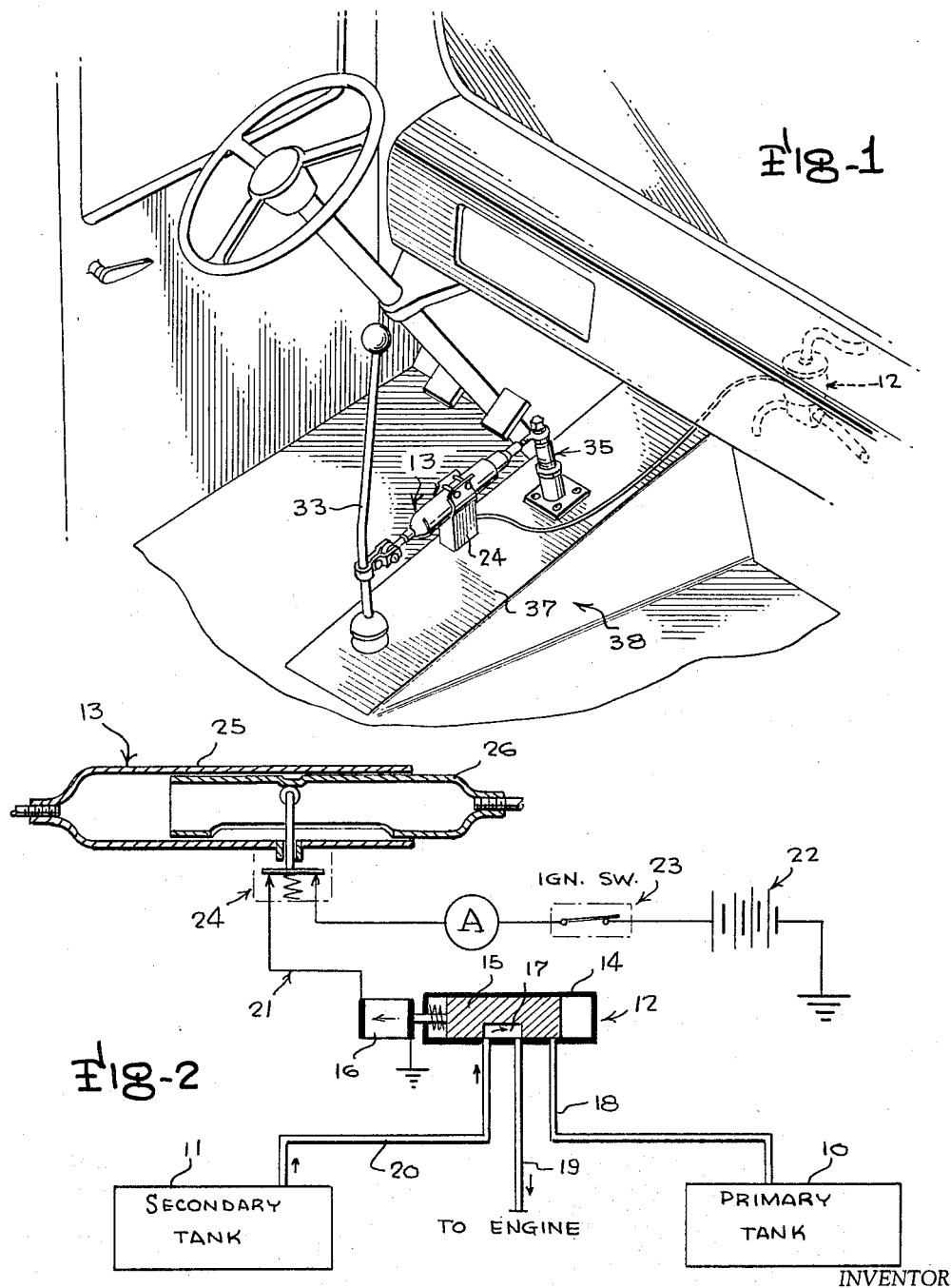

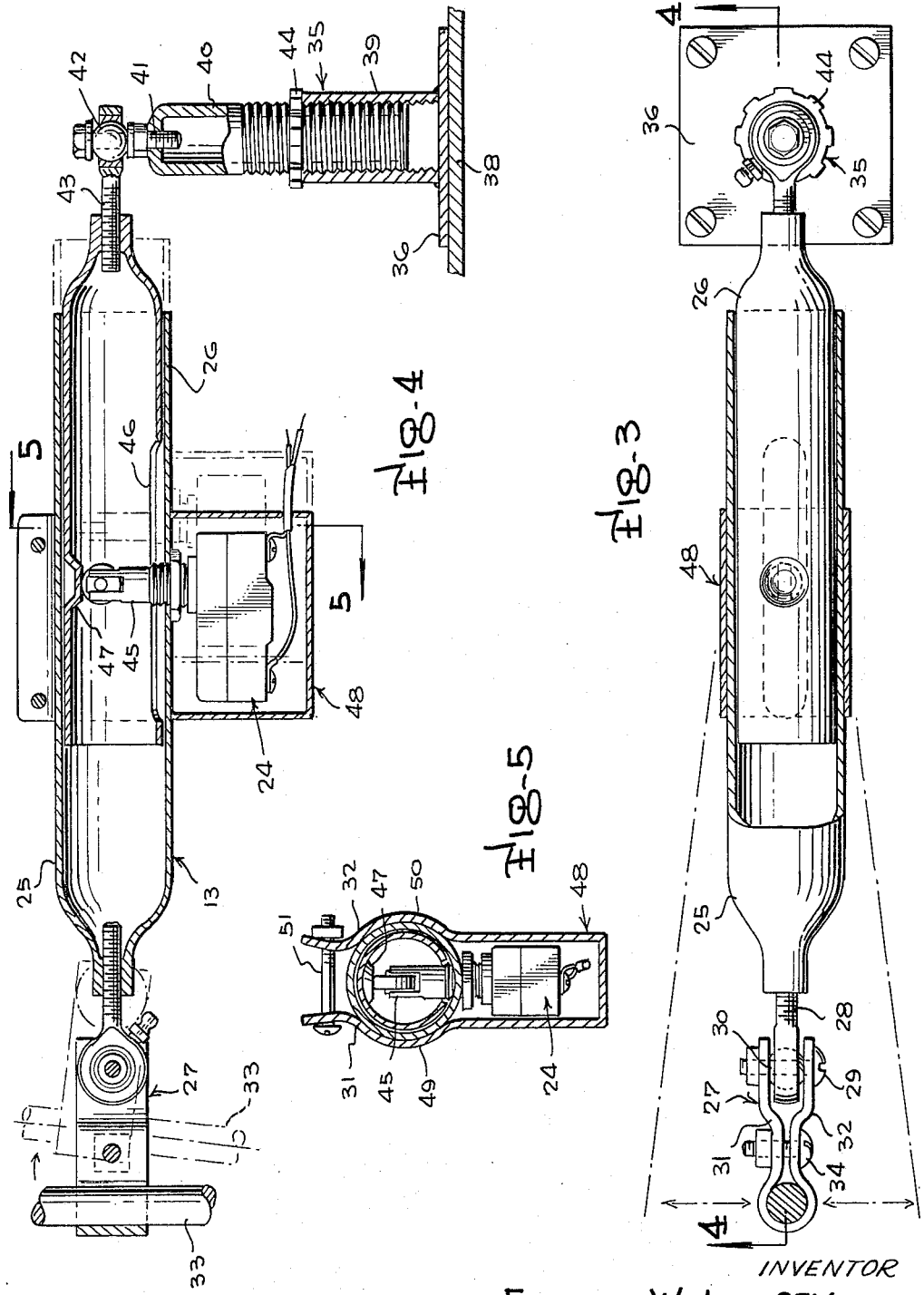

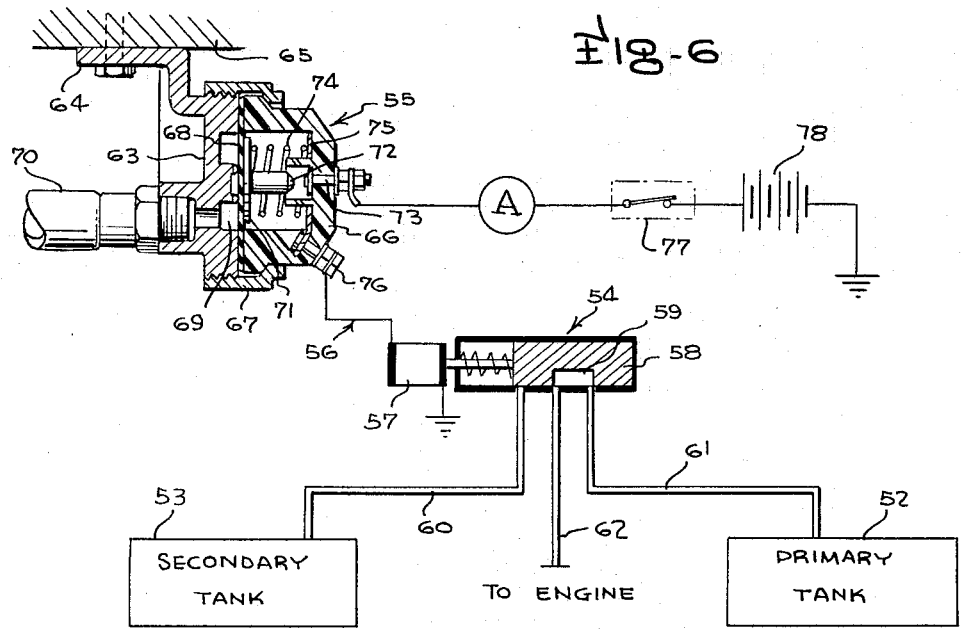
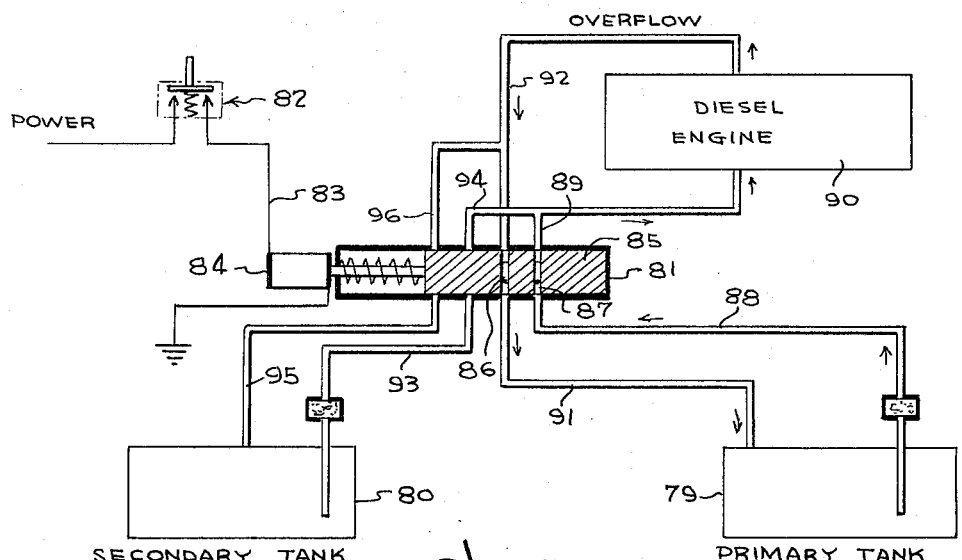

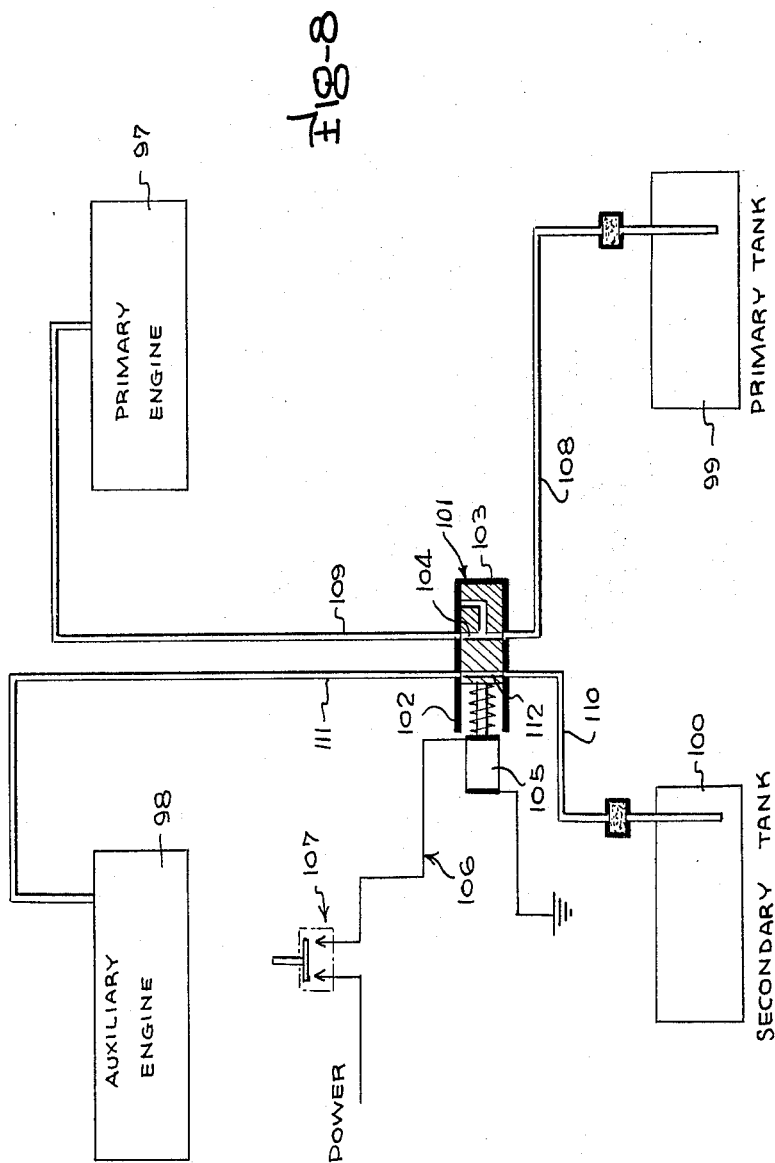

3,288,238
FUEL DIVERSION SYSTEM
Emmett W. Lindsey, 2422 Laburnum Ave.,
Roanoke, Va.
Filed July 16, 1964, Ser. No. 383,183
18 Claims. (Cl. 180—77)

This invention relates to self propelling vehicles having auxiliary devices operated by the prime mover means of the vehicle, and more particularly to a fuel diversion system for such vehicles.

In practically all of the states, revenue for the construction, improvement and maintenance of roads and projects comprising the public highway systems is derived from a tax levied on motor fuel intended for consumption by vehicles operated on the public roads. In addition to the state tax, the Federal Government also levies a similar tax on motor fuel. These taxes generally are added to the purchase price of the motor fuel by the dealers, and therefore, are paid by the ultimate consumer of the motor fuel at the time of purchase. Often, however, many types of self propelled vehicles are provided with auxiliary devices such as concrete mixers, fuel delivery systems, earth moving equipment and the like, which are operated either by the prime mover means of the vehicle or auxiliary mover means mounted on the vehicle. The fuel consumed in operating such auxiliary devices is not subject to motor fuel tax. However, under present practice of collecting the tax, this fuel is taxed in the same manner as the fuel consumed by the vehicles operating on the public highways.

Many of the taxing agencies, both State and Federal, have recognized that motor fuel taxes are not intended to be levied on fuel consumed for off-road purposes, but have been reluctant to permit any estimated apportionment of the fuel used for off-road requirements for the purpose of refunding the prepaid tax on such fuel. It, therefore, has been desirable to develop a system for accurately measuring the amount of fuel consumed for off-road purposes for which the prepaid motor fuel tax would be eligible for refund by either State or Federal taxing agencies.

Accordingly, the principal object of this invention is to provide a system which will provide a basis for determining the amount of motor fuel consumed by self-propelled vehicles for off-road purposes.

Another object of this invention is to provide a system which will provide a basis for determining the amount of fuel consumed by auxiliary devices, mounted on self-propelled vehicles and operated for off-road purposes.

A further object of the present invention is to provide a system adapted for use with a self-propelling vehicle having an auxiliary device operable for off-road purposes, wherein the auxiliary device is operated by the prime mover means of the vehicle, for apportioning the amount of motor fuel consumed by the prime mover means in propelling the vehicle and for operating the auxiliary device.

A still further object of this invention is to provide a fuel diversion system for a self-propelled vehicle having an auxiliary device operated by the prime mover means, wherein the fuel consumed by the prime mover means of the vehicle is supplied from selected independent sources under predetermined conditions.

Another object of this invention is to provide a fuel diversion system for self-propelled vehicles having auxiliary devices operated by the prime mover means of the vehicle, which can be readily installed in most conventional vehicles.

A further object of this invention is to provide a fuel diversion system for a self-propelled vehicle having an auxiliary device operated by the prime mover means of the vehicle, which will automatically divert fuel supplied to the prime mover means from a primary source to a secondary source responsive to predetermined conditions under which the auxiliary devices are operated by the prime mover means.

A still further object of this invention is to provide a fuel diversion system for self-propelling vehicles including a prime mover means for propelling the vehicle and a secondary mover means for operating an auxiliary device mounted on the vehicle and primary and secondary fuel sources, wherein fuel is supplied to the prime mover means from the primary fuel source when the vehicle is being propelled and fuel is supplied to both the prime and auxiliary mover means when the auxiliary device is being operated, responsive to predetermined conditions.

Another object of this invention is to provide a fuel diversion system for self propelling vehicles having auxiliary devices operable by the prime mover means of the vehicle for off-road purposes, which is simple in construction, easy to assembly and install in vehicles and inexpensive to manufacture.

Other objects and advantages of the present invention will become more apparent to those persons skilled in the art, from the following description taken in conjunction with the accompanying drawings, wherein:

FIGURE 1 is a perspective view of the interior of a conventional vehicle illustrating an embodiment of the invention installed in the vehicle;

FIGURE 2 is a diagrammatic, schematic view of the embodiment illustrated in FIGURE 1;

FIGURE 3 is a top plan view of a portion of the embodiment illustrated in FIGURE 1;

FIGURE 4 is a cross-sectional view taken along line 4—4 in FIGURE 3;

FIGURE 5 is a cross-sectional view taken along line 5—5 in FIGURE 4;

FIGURE 6 is a diagrammatic, schematic view of a second embodiment of the invention;

FIGURE 7 is a diagrammatic, schematic view of a third embodiment of the invention; and, FIGURE 8 is a diagrammatic, schematic view of a fourth embodiment of the invention.

Briefly described, the present invention relates to a fuel diversion system for a self propelling vehicle including at least one mover means and means for supplying fuel to the mover means, generally comprising primary and secondary fuel sources which are communicable with the fuel supply means, valve means operable for communicating the fuel supply means with the secondary fuel source, and means responsive to the nonpropulsion condition of the vehicle for actuating the valve means, thereby permitting fuel from the secondary fuel source to be supplied to the mover means of the vehicle.

Referring to FIGURES 1 through 5, there is illustrated a first embodiment of the invention which is particularly adapted for use in conventional vehicles having a gear shift lever of the floor type. Generally, referring to FIGURE 2, the embodiment includes a primary fuel tank 10, a secondary fuel tank 11, a valve 12 and a sensing device 13. The valve 12 is of the sliding piston type, including a valve body 14, a sliding piston 15 and a valve actuating solenoid 16. The valve is adapted to operate in the conventional manner, whereby under normal conditions the passageway 17 will communicate with the fuel line 18 interconnecting the tank 10 and the valve 12, and the fuel supply line 19 interconnecting the valve 12 and the engine of the vehicle. Upon energization of the solenoid 16, the sliding piston 15 will be moved to the left, as illustrated in FIGURE 2, so that the passageway 17 communicates with the fuel line 20 interconnecting the tank 11 and the valve 12, and the fuel supply line 19. The solenoid 16 is provided with an electrical supply circuit 21, connected to a battery 22, which includes ignition switch 23 of the vehicle and a switch 24, connected in series. The switch 24 is mounted on the sensing device 12, as will later be described.

As best illustrated in FIGURES 3 through 5, the sensing device 13 includes a cylindrical carrier member 25 and a cylindrical member 26 received within an open end of the carrier member 25 in telescopic relation therewith. The closed end of the carrier member 25 is connected to a linking member 27 by means of an eye bolt 28 threaded into the closed end of the carrier member. The bolt 28 is mounted on a bolt 29 on the linking member which has a spherical section 30, to provide a universal connection between the carrier member 25 and the link 27. The link 27 is substantially U-shaped, having a pair of leg portions 31 and 32 which are adapted to straddle the gear shift lever 33. The legs 31 and 32 are provided with recessed sections adjacent the straddling portion thereof to accommodate a bolt and nut combination 34, which clamps the linking member to the lever.

The carrier member 26, which is received in the carrier member 25, has its exterior end connected to a support member 35. The support member consists of a base plate member 36 which is adapted to be secured to the top wall 37 of the transmission housing 38, an internally threaded cylindrical post member 39 mounted on the base plate member and a threaded extension member 40 which is threaded into the opening of the post member 39. The upper end of the extension member 40 is provided with a connecting bolt 41 having a spherical section 42. The carrier member 26 is connected to the support member 35 by means of a bolt 43 extending outwardly from the closed end thereof, which is mounted on the spherical section 42 for universal movement relative to the bolt 41. It will be appreciated that the carrier members 25 and 26 being universally connected to the gear shift lever 33 and the support member 35, are adapted to move freely axially relative to each other when the gear shift lever 33 is moved through the various shifting positions. It further will be appreciated that the height of the sensing member can be adjusted by loosening the linking member 27 and adjusting its height on the gear shift lever, and rotating the extension member 40 of the support member 35 to adjust the height of the mounting bolt 42. Threadedly mounted on the extension member 40 is a lock nut 44 for locking the extension member 40 in the desired position following adjustment thereof.

Mounted on the bottom side of the carrier member 25 is the switch 24, having a depressible contact element 45 extending inwardly through a longitudinally disposed slot 46 in the carrier member 26. The upper end of the contact element 45 terminates slightly below the upper side of the wall of carrier member 26 and is engageable with an inwardly struck portion 47 defining a cam member. The specific location of the cam 47 is fixed, so that when the gear shift lever 33 is in the neutral position, whereby no drive is being transmitted by the transmission means for propelling the vehicle, the contact element 45 will be depressed, as illustrated in FIGURE 4 to close the switch 24. Under such conditions, current will flow in supply circuit 21 to energize solenoid 16. It will be appreciated that with the gear shift lever in a position other than neutral, the switch will remain open and no current will flow in supply circuit 21. The switch 24 is provided with a housing member 48 having a pair of upwardly extending leg members 49 and 50 which straddle and are clamped to the carrier member 25 by means of bolt and nut combinations 51. The rear wall of the housing is provided with a suitable opening for the lead wires of the switch.

Under normal conditions, the sliding piston 15 of the valve 12 is positioned so that the fuel line 18 communicates with fuel supply line 19, whereby fuel is delivered from the primary tank 10 to the engine of the vehicle.

Whenever, however, the gear shift lever 33 is moved to the neutral position, as illustrated in FIGURE 4, the carrier member 25 positions the contact element 45 of the switch 24 in registry with the cam member 47 to depress the contact element and close the switch 24. The closing of the switch 24 completes the electrical supply circuit 24 to energize the solenoid 16, causing the slide piston 15 to be moved as illustrated in FIGURE 2 of the drawings. With the sliding piston in the position as shown, the fuel line 18 is blocked and the fuel line 20 communicates with fuel supply line 19, so that fuel is supplied to the engine of the vehicle from the secondary tank 11. Under such circumstances, the engine of the vehicle will be supplied with fuel from the secondary tank 11 when operating the auxiliary devices of the vehicle. Therefore, the fuel in the secondary tank 11 would be consumed, essentially, only for off-road purposes. The prepaid motor fuel tax on this fuel then would be eligible for refund to the owner of the vehicle.

Referring to FIGURE 6 of the drawings, there is illustrated a diagrammatic, schematic view of the second embodiment of the present invention. This embodiment generally comprises a primary fuel tank 52 which is intended for use as a fuel supply source for propelling the vehicle on public roads, a secondary fuel tank 53 intended for use as a fuel source for the engine of the vehicle when operating the auxiliary equipment for off-road purposes, a selector valve 54, a sensing device 55 and an electrical supply circuit 56 for the solenoid 57 of the valve 54, similar to the valve described in connection with the first embodiment. The valve 54 includes a sliding piston 58, having a fluid passageway 59 for communicating fuel lines 60 and 61 alternately with the fuel supply line 62. Under normal conditions, the sliding piston 58 is positioned as illustrated in FIGURE 6, so that fuel is supplied from the primary fuel tank 52 to the engine of the vehicle. Upon energization of the solenoid 57, the sliding piston 58 is adapted to move to the left so that fuel is supplied to the engine of the vehicle from the secondary supply tank 53.

The sensing device 55 essentially consists of a pressure responsive electrical switch which is operatively connected to the emergency brake system of the vehicle. The device comprises a base member 63 having a bracket portion 64 adapted to be mounted on the vehicle chassis 65 and a housing member 66 consisting of a non-conducting material, which is mounted on the base member and secured in position by means of a clamping ring 67. Disposed between the base member 63 and the housing member 66 is a flexible diaphragm 68 which provides a fluid tight chamber 69 in the base member, communicable with the emergency brake system of the vehicle by means of an air hose 70. Mounted on the flexible diaphragm 68 on the side opposite from the chamber 69 is a current conducting plate 71 having a projecting contact element 72, engageable with an aligned terminal 73 mounted on the housing member 66. Under normal conditions, the diaphragm 68 is maintained in the position illustrated in FIGURE 6, by means of a spring 74 interposed between, and in electrical conducting contact with, the plate member 71 and the current conducting element 75 which is connected to a terminal 76. It will be noted that the terminals 73 and 76 of the sensing device are connected in series with the supply circuit 56. Also connected in series with the circuit are the igniton swtch 77 and a battery 78.

Under normal operating conditions the sliding piston 58 of valve 54 will occupy the position illustrated in FIGURE 6, so that fuel will be supplied to the engine of the vehicle from the primary fuel tank 52. Whenever, however, the emergency brake system has been actuated, as when it is desirable to utilize the auxiliary equipment of the vehicle operated by the engine of the vehicle, air under pressure will be admitted into chamber 69 to move the diaphragm 68 to the right, causing the contact element 72 to contact the terminal 73. The supply circuit 56 then will be closed, thereby energizing solenoid 57. The energization of the solenoid will cause the sliding piston 58 to move to the left relative to FIGURE 6, so that the engine of the vehicle will be supplied with fuel from the secondary fuel tank 53. It will thus be appreciated that under normal conditions the engine of the vehicle will be supplied with fuel from the primary fuel tank 52, and when the emergency brake system has been actuated, the vehicle will be supplied with fuel from the secondary fuel tank 53. Therefore, assuming that the auxiliary equipment is operated by the engine of the vehicle when the emergency brake system has been applied, fuel will be supplied only by the secondary fuel tank 53, which can be accurately measured for the purposes of computing the amount of prepaid tax eligible for refund.

FIGURE 7 of the drawings illustrates a further embodiment of the invention which is essentially similar to the embodiment illustrated in FIGURES 1 through 5, but which is particularly suitable for use with vehicles having diesel engines. This embodiment generally comprises a primary fuel tank 79, a secondary fuel tank 80, a selector valve 81, a sensing mechanism (not shown) including a switching element 82, and an electrical supply circuit 83 for the solenoid 84 of the valve 81, which includes the switching element 82 connected in series. The sliding piston 85 of the valve 81 is provided with a pair of fluid passageways 86 and 87. With the valve positioned as illustrated in FIGURE 7, the passageway 87 registers with fuel lines 88 and 89 to supply fluid from the primary fuel tank 79 to the engine 90. Simultaneously, the passageway 86 communicates with fluid lines 91 and 92 to return the overflow fuel from the engine to the primary fuel tank 79. Upon energization of the supply circuit 83, the sliding piston 85 is adapted to move to the left so that passageway 87 communicates with fuel lines 93 and 94 and fuel is supplied to the engine 90 from the secondary fuel tank 80. Simultaneously, the passageway 86 communicates with fuel lines 95 and 96 to return the overflow fuel from the engine to the secondary fuel tank 80.

FIGURE 8 of the drawings illustrates a diagrammatic, schematic view of another embodiment of the present invention in which a separate mover means is utilized to operate the auxiliary equipment. This embodiment generally comprises a primary engine 97 which is utilized for propelling the vehicle, an auxiliary engine 98 for operating the auxiliary equipment mounted on the vehicle, a primary fuel tank 99 adapted to supply fuel to the primary engine, a secondary fuel tank 100 adapted to supply fuel to both the primary and the auxiliary engines and a selector valve 101. The selector valve consists of a valve body 102, a sliding piston 103 having a fluid passageway 104 and a solenoid 105 for actuating the sliding piston. The solenoid 105 is energized by means of an electrical supply circuit 106 including a switching member 107 which is part of a sensing device (not shown) similar to any of those devices described in connection with earlier mentioned embodiments.

Under normal operating conditions the sliding valve 103 occupies the position as illustrated in FIGURE 8, whereby the passageway 104 communicates with fuel lines 108 and 109, permitting fuel to be supplied to the primary engine from the primary fuel tank. When the switch 107 is closed, however, as under the previously described predetermined conditions, current flows in the supply circuit 106 to energize the valve solenoid 105. The solenoid 105 then acts to move the sliding piston 103 to the left relative to FIGURE 8, so that the fluid passageway 104 communicates with fuel lines 109, 110 and 111, permitting fuel to be supplied both to the primary and auxiliary engines from the secondary tank. This will permit the auxiliary engine to provide drive for operating the auxiliary equipment and the primary engine to provide drive for operating the electrical and air brake systems of the vehicle. It will be appreciated that the switch 107 is closed during such conditions as when the auxiliary equipment is operated for off-road purposes. The sliding piston 103 also is provided with a passageway 112 which communicates with fuel lines 110 and 111 when passageway 104 communicates with fuel lines 108 and 109, as illustrated in FIGURE 8, permitting fuel to be supplied to the auxiliary engine from the secondary tank to operate the auxiliary equipment while the vehicle is in transit. The amount of fuel consumed from the secondary fuel tank then can be accurately measured for the purpose of computing the amount of prepaid tax eligible for refund to the owner of the vehicle.

From the foregoing detailed description it will be evident that there are a number of changes, adaptations and modifications of the present invention which come within the province of those skilled in the art. However, it is intended that all such variations not departing from the spirit of the invention, be considered as within the scope thereof as limited solely by the appended claims.

What I claim is:

1. A fuel diversion system for a self propelling vehicle including at least one mover means and means for supplying fuel to the mover means comprising first and second fuel sources communicable with said fuel supply means, means for sensing the nonpropulsion condition of means operative to produce a nonpropulsion condition of said vehicle and valve means responsive to said sensing means to communicate said fuel supply means with a selected one of said fuel sources thereby permitting fuel from the selected fuel source to be supplied to said mover means.

2. A fuel diversion system for a self propelling vehicle including at least one mover means and means for supplying fuel to the mover means comprising first and second fuel sources communicable with said fuel supply means, valve means operable for communicating said fuel supply means with a selected one of said fuel sources, means for sensing a nonpropelling condition of means operative to produce a nonpropulsion condition of said vehicle and means responsive to said sensing means for actuating said valve to communicate said fuel supply means with the selected one of said fuel sources thereby permitting fuel from the selected fuel source to be supplied to said mover means.

3. A fuel diversion system for a self propelling vehicle including at least one mover means, means for supplying fuel to the mover means and means operative for conditioning said vehicle selectively for propulsion and nonpropulsion conditions comprising first and second fuel sources communicable with said fuel supply means, valve means operable for communicating said fuel supply means with a selected one of said fuel sources and means responsive to said conditioning means in the nonpropulsion condition for actuating said valve means to communicate said fuel supply means with the selected one of said fuel sources thereby permitting fuel from the selected fuel source to be supplied to said mover means.

4. A fuel diversion system for a self propelling vehicle including a prime mover means, fuel supply means for said prime mover means and means for conditioning said vehicle selectively for propulsion and nonpropulsion conditions comprising first and second fuel sources communicable with said fuel supply means, electrically actuated valve means operable for communicating said fuel supply means with a selected one of said fuel sources and electrical means responsive to said conditioning means in the nonpropulsion condition for energizing said electrically actuated valve means thereby permitting fuel from the selected fuel source to be supplied to the prime mover means of said vehicle.

5. A fuel diversion system for a self propelling vehicle including prime mover means, fuel supply means for said prime mover means and means for conditioning said vehicle selectively for propulsion and nonpropulsion conditions comprising first and second fuel sources communicable with said fuel supply means, electrically actuated valve means operable for communicating said fuel supply means with a selected one of said fuel sources, an electrical supply circuit for energizing said electrically actuated valve means and said supply circuit having switching means responsive to said conditioning means in the non-propulsion condition for energizing said electrical supply circuit thereby actuating said valve means and permitting fuel from the selected fuel source to be supplied to the prime mover means of said vehicle.

6. A fuel diversion system for a self propelling vehicle including prime mover means having fuel supply means, transmission means and means for disengaging said transmission means comprising first and second fuel sources communicable with said fuel supply means, valve means operable for communicating said fuel supply means with a selected one of said fuel sources and means responsive to the disengagement of said transmission means for actuating said valve means thereby permitting fuel from the selected fuel source to be supplied to the prime mover means of said vehicle.

7. A fuel diversion system for a self propelling vehicle including prime mover means having fuel supply means, transmission means and means for disengaging said transmission means comprising first and second fuel sources communicable with said fuel supply means, electrically actuated valve means operable for communicating said fuel supply means with a selected one of said fuel sources and electrical means responsive to the disengagement of said transmission means for actuating said valve means thereby permitting fuel from the selected fuel source to be supplied to the prime mover means of said vehicle.

8. A fuel diversion system for a self propelling vehicle including prime mover means having fuel supply means, transmission means and means for disengaging said transmission means comprising first and second fuel sources communicable with said fuel supply means, electrically actuated valve means operable for communicating said fuel supply means with a selected one of said fuel sources, an electrical supply circuit for energizing said electrically actuated valve means and said supply circuit having switching means responsive to the disengagement of said transmission means for energizing said electrical supply circuit thereby actuating said valve means and permitting fuel from the selected fuel source to be supplied to the prime mover means of said vehicle.

9. A fuel diversion system for a self propelling vehicle including prime mover means having fuel supply means and transmission means having a control lever adapted to assume a neutral position whereby no drive is transmitted by said transmission means comprising first and second fuel sources communicable with said fuel supply means, valve means operable for communicating said fuel supply means with a selected one of said fuel sources and means responsive to the neutral position of said control lever for actuating said valve means thereby permitting fuel from the selected fuel source to be supplied to the prime mover means of said vehicle.

10. A fuel diversion system for a self propelling vehicle including prime mover means having fuel supply means and transmission means having a control lever adapted to assume a neutral position whereby no drive is transmitted by said transmission means comprising first and second fuel sources communicable with said fuel supply means, electrically actuated valve means operable for communicating said fuel supply means with a selected one of said fuel sources and electrical means responsive to the neutral position of said control lever for actuating said valve means thereby permitting fuel from the selected fuel source to be supplied to the prime mover means of said vehicle.

11. A fuel diversion system for a self propelling vehicle including prime mover means having fuel supply means and transmission means having a control lever adapted to assume a neutral position whereby no drive is transmitted by said transmission means comprising first and second fuel sources communicable with said fuel supply means, an electrically actuated valve means operable for communicating said fuel supply means with a selected one of said fuel source, an electrical supply circuit for energizing said electrically actuated valve means and said supply circuit having switching means responsive to the neutral position of said control lever for energizing said electrical circuit thereby actuating said valve means and permitting fuel from the selected fuel source to be supplied to the prime mover means of said vehicle.

12. A fuel diversion system for a self propelling vehicle including prime mover means having fuel supply means and transmission means having a control lever adapted to assume a neutral position whereby no drive is transmitted by said transmission means comprising first and second fuel sources communicable with said fuel supply means, electrically actuated valve means operable for communicating said fuel supply means with a selected one of said fuel sources, first and second carrier members, one of said carrier members being operatively connected to said control lever and movable therewith relative to the other of said members, the other of said members being operatively connected to said vehicle, an electrical supply circuit for energizing said electrically actuated valve means having switching means mounted on one of said carrier members and cam means mounted on the other of said carrier members engageable with a switch closing element of said switching means when said control lever is in the neutral position whereby the electrical supply circuit is energized to actuate said valve means and permit fuel from the selected fuel source to be supplied to the primer mover means of said vehicle.

13. A fuel diversion system for a self propelling vehicle including prime mover means having fuel supply means and transmission means having a control lever adapted to assume a neutral position whereby no drive is transmitted by said transmission means comprising first and second fuel sources communicable with said fuel supply means, electrically actuated valve means operable for communicating said fuel supply means with a selected one of said fuel sources, first and second carrier members, a first carrier member consisting of a cylindrical member being connected at one end thereof to said control lever by means of a universal connection, a second carrier member consisting of a cylindrical member connected at one end to said vehicle by means of a universal connection and extending into said first carrier member in telescopic relation therewith, an electrical supply circuit for energizing said electrically actuated valve means having switching means mounted on said first carrier member, said switching means having a switch closing element extending through a longitudinally disposed slot in said second carrier member and cam means mounted on the second carrier member engageable with the switch closing element of said switch means when said control lever is in said neutral position whereby the electrical supply circuit is energized to actuate said valve means and permit fuel from the selected fuel source to be supplied to the prime mover means of said vehicle.

14. A fuel diversion system for a self propelling vehicle including prime mover means, means for supplying fuel to the prime mover means and an emergency brake system comprising first and second fuel sources communicable with said fuel supply means, valve means operable for communicating said fuel supply means with a selected one of said fuel sources and means responsive to the actuation of said brake system for actuating said valve means thereby permitting fuel from the selected fuel source to be supplied to the prime mover means of said vehicle.

15. A fuel diversion system for a self propelling vehicle including a prime mover means, fuel supply means for said prime mover means and an emergency brake system comprising first and second fuel sources communicable with said fuel supply means, electrically actuated valve means operable for communicating said fuel supply means with a selected one of said fuel sources and electrical means responsive to the actuation of said brake system for energizing said electrically actuated valve means thereby permitting fuel from the selected fuel source to be supplied to the prime mover means of said vehicle.

16. A fuel diversion system for a self propelling vehicle including prime mover means, fuel supply means for said prime mover means and an emergency brake system comprising first and second fuel sources communicable with said fuel supply means, electrically actuated valve means communicable with said fuel supply means with a selected one of said fuel sources, an electrical supply circuit for energizing said electrically actuated valve means and said supply circuit having switching means responsive to the actuation of said brake system for energizing said electrical supply circuit thereby actuating said valve means and permitting fuel from the selected fuel source to be supplied to the prime mover means of said vehicle.

17. A fuel diversion system for a self propelling vehicle having an auxiliary apparatus including a first mover means for propelling said vehicle, a second mover means for said auxiliary apparatus and means for supplying fuel to said first and second mover means comprising first and second fuel sources communicable with said fuel supply means, valve means operable for selectively communicating said fuel supply means with a selected one of said fuel sources and means for sensing the nonpropulsion condition of means operative to produce a nonpropulsion condition of said vehicle, operative for actuating said valve means thereby permitting fuel from the selected fuel source to be supplied to said first and second mover means.

18. A fuel diversion system for a self propelling vehicle having an auxiliary apparatus including a first mover means for propelling said vehicle, transmission means for said first mover means, a second mover means for said auxiliary apparatus, means for supplying fuel to said first and second mover means and means for disengaging said transmission means comprising first and second fuel sources communicable with said fuel supply means, valve means operable for selectively communicating said fuel supply means with a selected one of said fuel sources and means responsive to the disengagement of said transmission means for actuating said valve means thereby permitting fuel from the selected fuel source to be supplied to said first and second mover means.

References Cited by the Examiner

UNITED STATES PATENTS

| | | | |
|---|---|---|---|
| 1,303,290 | 5/1919 | Gibbs | 180—54 |
| 2,304,276 | 12/1942 | Peckworth | 180—77 |
| 2,647,566 | 8/1953 | Hayne. | |

A. HARRY LEVY, *Primary Examiner.*